(12) United States Patent
Bowen

(10) Patent No.: US 10,343,933 B1
(45) Date of Patent: Jul. 9, 2019

(54) SELF PRIMING AND EVACUATING LIQUID STERILIZING SYSTEM

(71) Applicant: John Guy Bowen, Prescott, AZ (US)

(72) Inventor: John Guy Bowen, Prescott, AZ (US)

( * ) Notice: Subject to any disclaimer, the term of this patent is extended or adjusted under 35 U.S.C. 154(b) by 0 days.

(21) Appl. No.: 16/194,314

(22) Filed: Nov. 17, 2018

(51) Int. Cl.
  *B01D 3/42* (2006.01)
  *C02F 1/02* (2006.01)
  *C02F 1/00* (2006.01)

(52) U.S. Cl.
  CPC .............. *C02F 1/02* (2013.01); *C02F 1/008* (2013.01); *B01D 3/42* (2013.01); *C02F 1/006* (2013.01); *C02F 2201/005* (2013.01); *C02F 2209/02* (2013.01); *C02F 2209/03* (2013.01); *C02F 2301/04* (2013.01); *C02F 2301/066* (2013.01); *C02F 2303/04* (2013.01)

(58) Field of Classification Search
  CPC .... C02F 1/02; C02F 2209/02; C02F 2301/04; C02F 2301/066; C02F 2209/03; C02F 2201/005; C02F 1/006; C02F 2303/04; C02F 1/008; C02F 1/04; C02F 1/043; C02F 1/10; C02F 1/20; C02F 2301/06; B01D 3/42; B01D 1/0011; B01D 1/0017; B01D 1/0082; B01D 1/14; B01D 19/001; B01D 19/0063; B01D 19/0068
  USPC ....... 210/138, 141, 149, 175, 180, 742, 774; 422/1, 109, 110, 116
  See application file for complete search history.

(56) References Cited

U.S. PATENT DOCUMENTS

| | | | | |
|---|---|---|---|---|
| 1,518,784 A | * | 12/1924 | Gibson | B01D 19/0042 210/180 |
| 3,096,735 A | * | 7/1963 | Wise | D05B 35/062 112/136 |
| 3,296,122 A | * | 1/1967 | Karassik | C02F 1/02 165/66 |
| 4,909,988 A | * | 3/1990 | Childers | A61L 2/24 422/116 |
| 5,132,084 A | * | 7/1992 | Harrell | A61L 2/07 422/110 |
| 5,277,875 A | * | 1/1994 | Albright | A61L 2/24 422/109 |
| 5,403,564 A | | 4/1995 | Katschnig et al. | |
| 5,587,055 A | * | 12/1996 | Hartman | B01D 3/42 202/162 |
| 6,058,247 A | * | 5/2000 | Lahey | B01D 1/0017 219/401 |
| 6,136,362 A | | 10/2000 | Ashton | |
| 6,579,494 B1 | | 6/2003 | Chevallet et al. | |
| 6,585,890 B2 | * | 7/2003 | Li | A61K 33/00 210/175 |
| 6,673,311 B1 | | 1/2004 | Sotoyamam et al. | |

(Continued)

Primary Examiner — Joseph W Drodge

(57) ABSTRACT

Apparatus and method for providing a self priming, self evacuating, cyclicly operating system in which liquid is disposed in a closed, fluid tight heating chamber for sterilization. Only a single parameter, temperature, is monitored to accomplish a desired liquid SAL. A pair of valves are singly and sequentially opened and closed within four phases (steps) to provide for liquid displacement. Operation cycles through four phases which include opening an inlet valve for filling the heating chamber, heating liquid to a predetermined temperature at which the liquid is sterilized to the desired SAL, opening an outlet valve whereby internally generated pressure delivers sterilized liquid to a dispensing container and a delay for keeping valve opening separate.

4 Claims, 7 Drawing Sheets

(56) References Cited

U.S. PATENT DOCUMENTS

| | | | | |
|---|---|---|---|---|
| 6,932,889 | B1* | 8/2005 | Holcomb | B01D 1/04 203/11 |
| 7,089,763 | B2* | 8/2006 | Forsberg | E03B 3/28 62/635 |
| 7,211,187 | B2* | 5/2007 | Lumbert | C02F 1/78 210/153 |
| 9,211,351 | B2 | 12/2015 | Bowen | |
| 9,757,485 | B2 | 9/2017 | Papadopoulos et al. | |
| 2006/0144700 | A1* | 7/2006 | Carson | A61L 2/035 204/252 |
| 2012/0118799 | A1* | 5/2012 | Bowen | C02F 1/02 210/103 |
| 2013/0032546 | A1* | 2/2013 | Scheuren | C02F 1/305 210/748.01 |

* cited by examiner

SELF PRIMING AND EVACUATING LIQUID STERILIZING SYSTEM

FIELD OF INVENTION

This invention relates to apparatus and methods by which aqueous (water based) liquids are decontaminated, collected and used for culinary purposes. This invention is further related to methods which decontaminate such aqueous liquids without use of chemical or light energy processes to a predetermined sterility assurance level (SAL).

BACKGROUND OF THE INVENTION

There is an ever increasing need for new, more effective, efficient and lower cost methods for decontaminating water and other water based (aqueous) liquids. As an example, Center for Disease Control and Prevention (CDC) reports in a Mar. 6, 2003, report on BACTERIAL WATERBORNE DISEASES that each year there are 3.5 billion episodes of illness and a resulting three million estimated deaths caused by contaminated water and despite global efforts improvements have barely kept pace with population increases. From an Emerging Infectious Diseases article, dated 10 Oct. 2005, it was reported that seventeen percent of all deaths of children under five years of age in the developing world was caused by contaminated water. With these statistics, it is astounding that no water purification method is currently available and sufficiently low in cost to prevent such water borne illnesses. The simplicity and associated potential low cost of manufacture and operation of devices made according to the instant invention promise to make substantial in-roads toward a solution to these problems.

A profound example of changes in methods of water purification is a new water treatment plant located in Salt Lake City, Utah. Rather than chlorine, this plant employs ozone and ultraviolet light, as ultraviolet light is more effective than chlorine in terms of decontaminating water containing *cryptosporidium* and other chlorine resistant microbes. However, use of light is known to sometimes be ineffective and at other times be unpredictable when used in water that has variable light transmission quality.

While decontamination and purification are terms generally considered in an ultimate context of complete elimination of any and all undesirable contaminants, it is generally known, as disclosed on page 68 of *Principles and Methods of Sterilization*, $2^{nd}$ Edition, published by Charles C. Thomas, Springfield, Ill., in 1983, that one hundred percent sterilization should never be considered as completely attained. Rather, biological contaminants should be considered to be eliminated logarithmically, such as being measured by time constants dependent upon intensity and method of treatment.

To codify a standard for sterilization, the Association for the Advancement of Medical Instrumentation (AAMI), 110 N. Glebe Road, Suite 220, Arlington, Va. 22201-4795 has issued a proposed standard for selecting appropriate Sterility Assurance Levels (SALs) (See *Proposed Standard on Selecting Appropriate Sterility Assurance Levels* published as an Internet bulletin on Feb. 10, 2000). While, SALs are generally used to determine levels of sterilization for medical products, a similar standard may be considered for water and other aqueous liquid purification, as well. AAMI reports, as examples, that items which come into contact with skin may need only an SAL of $10^{-3}$ while implants or IV injectable liquid pathway products should be sterilized to an SAL of $10^{-6}$.

Similar considerations might be applied to water purification. Drinking water from one source might be sufficiently pure at an SAL of $10^{-3}$ while another source might require an SAL of $10^{-4}$ or better. It may also be desired to have a single water purification or sterilization system which could be used for various purposes (e.g. for drinking water or for a medical application). Also, such aqueous liquids as milk might require different sterilization for different packaging and storage requirements. This invention is meant to fulfill a variety of applications related to meeting requirements for a variety of sterilization levels.

A number of U.S. Patents cite methods and apparatus for achieving various levels of sterilization of aqueous liquids. An example of such a patent is provided by U.S. Pat. No. 6,136,362, issued Oct. 24, 2000, to Roger J. Ashton (Ashton), titled HIGH TEMPERATURE/SHORT TIME PASTEURIZATION SYSTEM AND METHOD OF CLEANING. Ashton particularly teaches a way of cleaning a system used for pasteurization of milk. While pasteurization has long been used to improve safety and lengthen term for storage of milk, pasteurized milk has also been recognized as still containing microbes and, therefore, is not completely sterilized. Even so, continuous flow pasteurization is not taught in Ashton, but rather Ashton teaches a system for cleaning a pasteurization circuit without connecting and disconnecting apparatus. Also, Ashton does not teach regulating pressure at a temperature required for sterilization.

Another U.S. Pat. No. 5,403,564 issued Apr. 4, 1995 to Helmut Ketschnig et al. (Ketschnig), titled APPARATUS FOR HEATING AND THERMAL DECONTAMINATING A PUMPABLE OR POURABLE MATERIAL, discloses apparatus for heating and thermal decontamination using a microwave unit. As such, Ketschnig makes no attempt to insure that non-sterile material will not contaminate a conduit leading from the microwave unit to a discharge tube. In other words, Ketschnig sterilizes by means of radiation and assures any achieved sterilization only within the zone of radiation.

A U.S. Pat. No. 6,673,311 B1 issued Jan. 6, 2004, to Kazuyoshi Sotoyama, et al., (Sotoyama) titled METHOD AND APPARATUS FOR CONTINUOUS HEAT STERILIZATION OF LIQUID, discloses sterilization by heating and rapid release of pressure. As such, Sotoyama employs a rapid high pressure release (which may be a pressure drop in the range of 2 to 100 MPa). Such an initial pressure is much higher than pressure employed in the instant invention which is in the range of 0.2 to 0.5 MPa, and no rapid pressure release is employed in the instant invention.

U.S. Pat. No. 6,579,494 B1 issued Jun. 17, 2003, to Jacques Chevallet, et al. (Chavallet) and titled PROCESS AND DEVICE FOR STERILIZING AND DISPENSING A LIQUID FOR MEDICAL USE discloses method and apparatus for sterilizing liquids for medical use. As such, Chavellet discloses and claims a validating structure which permits and requires a "means for validating a sterilization treatment" resulting from an implemented adjustable heating apparatus. Chevallet makes an interesting point relative to checking a $10^{-6}$ level of viable microorganisms in a continuous flow apparatus, saying that such a check according to Poisson probability is unachievable.

U.S. Pat. No. 9,211,351 issued December 2015 to John G. Bowen (BOWEN) and titled METHODS FOR VARIABLY STERILIZING AQUEOUS LIQUIDS discloses a continuous flow sterilizer. BOWEN teaches employing apparatus operating at substantially fixed temperatures and pressures at variable flow rates to achieve a predetermined SAL.

Commonly, recently allowed patents disclose continuous flow systems which rely upon temperature, pressure and a given dwell time to accomplish a desired SAL. As an example, see U.S. Pat. No. 9,757,485, titled SYSTEM AND METHOD FOR FLUID STERILIZATION and awarded to Papadopoulos, et al., Sep. 12, 2017. However, recent studies have shown that in a volume of water raised to a predetermined kill-temperature, achievement of an associated SAL in substantially instantaneous, not requiring monitoring of pressure or requiring a prescribed dwell time. The instant invention disclosed herein is therefore based upon measurement of a single parameter, temperature.

BRIEF SUMMARY AND OBJECTS OF THE INVENTION

In brief summary, this novel invention provides an opportunity for providing sterilized water at a low cost while alleviating all of the known problems related to safely and efficaciously decontaminating aqueous liquids for a variety of uses. The invention is a cyclicly operating device which receives influent contaminated liquid or impure liquid of questionable pollution and provides a self-evacuating sterilized effluent product decontaminated to meet a variety of applications. Further, sterilization levels (i.e. SALs) may be facilely, accurately, predictively and variably controlled, by setting a predetermined temperature to which the liquid is raised. Thus, sterilization to various levels is realized through control of but a single variable, i.e. temperature. As this system is primarily directed toward water sterilization, the term "water" is alternately used as a specifier for liquid. It should be understood that liquids and liquid mixtures other than water may be sterilized by the inventive process disclosed herein, but the use of water is considered to provide clarification of the primary target.

Generally, a system, made according to the present invention, comprises the following items:

1. An enclosing housing comprising a chamber into which water is displaced to be sterilized;
2. An upstream source of contaminated water to be sterilized, the upstream source being provided at a pressure which displaces water into the chamber;
3. A fully enclosed pathway from the source to the chamber which is interrupted by a first normally closed valve;
4. A reservoir for receiving water after being sterilized, the reservoir having a receiving water back pressure which is conducive to flow from the chamber when pressurized by liquid brought to a Critical-sterilizing Temperature (CT);
5. A fully enclosed pathway from the chamber to the reservoir which is also interrupted by a second normally closed valve;
6. A heating element which communicates heat to water within the chamber thereby raising the temperature thereof;
7. A temperature meter disposed to measure the temperature of water disposed in the chamber, the meter providing a measurable output for use by a system controller;
8. A power source (e.g. electrical) for powering and controlling the system;
9. A source of energy for heating the water (which may be the same power source provided for the control system);
10. A system management controller which senses and is responsive to measured temperatures and controls operations of the valves to provide for sterilization via cyclic action through the following steps:
    a. when power is "on", sequentially opening the first valve to permit water to be displaced from the source into the chamber for a long enough period to assure the chamber is adequately filled with water (and gas is purged therefrom to effect chamber priming);
    b. at the end of the period, closing the first valve (note at this point, water is heated in a closed chamber);
    c. heating continues, driving temperature upward while being monitored by the controller until measured temperature reaches at least a Critical-sterilizing Temperature (CT), the temperature at which the water has achieved a desired SAL;
    d. upon detection of the chamber temperature reaching the CT, opening second valve. Upon opening the second valve, pressure within the chamber commences flow of sterilized water flow from the chamber into the reservoir. Water leaving the reservoir creates a void resulting in a state change of a portion of the water within the chamber to steam which further acts to displace additional water from the chamber. As is well known in thermodynamics, such a state change reduces the temperature of water remaining in the chamber.
    e. when temperature of the water is reduced to a level predetermined to indicate adequate or desired outflow from the chamber, the controller closes the second valve;
    f. as a precaution, the controller delays next operation until second valve closure is assured;
    g. To continue normal operation, the controller then redirects system operation to step (a) whereat operation is cycled to produce a next bolus of sterilized water from the chamber.

Note that opening valve 1 with fluid still under pressure in the chamber provides for dispensing of gas (air and steam) from the chamber into the source liquid. By such a process, air is step-wise displaced from the chamber, providing for spontaneous priming. Also, note that, except for source pressure, no additional motive force needs to be applied to water to for displacement into the reservoir.

Accordingly, it is a primary object to provide an efficacious aqueous liquid purification system which cyclicly sterilizes aqueous liquid to a predetermined SAL.

It is another primary object to provide a water purification system that is self-priming.

It is a fundamental object to provide an aqueous liquid purification system which controllably sterilizes an aqueous liquid to a predetermined SAL by use of only one measured parameter, i.e. temperature.

It is an object to provide a system by which an inherently generated pressure causing effluent to flow from the system.

These and other objects and features of the present invention will be apparent from the detailed description taken with reference to accompanying drawings.

DETAILED DESCRIPTION OF THE ILLUSTRATED EMBODIMENTS

In this description, the term proximal is used to indicate nearness of a referenced item to the object of the sentence describing its position. The term distal should be interpreted as indicating "away from" a referenced item. Numbers and primes of the same numbers are used to indicate items of related mechanics and function, but which may have physical differences. It should be noted that embodiments disclosed herein and hereafter are exemplary.

Figure 1:
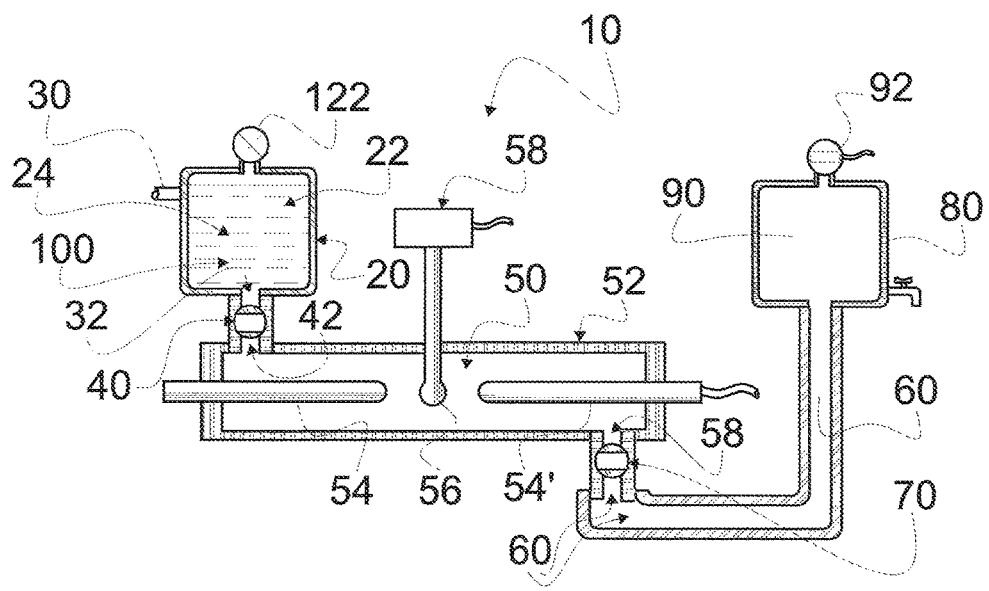
FIG. 1 is a schematic diagram of a water sterilizing system made according to the present invention wherein only a source housing is seen to contain liquid.

Reference is now made to the embodiment illustrated in FIG. 1 wherein a cyclic sterilizing system 10 made according to the present invention is seen to comprise a source housing 20 which comprises a vessel 22 which receives a supply, of pressurized liquid 24 to be sterilized, through a source pipe 30. Housing 20 comprises an exit orifice 32, fluid flow through which is gated by a first or inlet valve 40. When valve 40 is opened, a pathway 42 permits liquid displacement from housing 20 into a heating chamber 50 (and retrograde gas displacement into vessel 22).

Chamber 50 is encased by an elongated housing 52 which also encloses heating elements 54 and 54' and a temperature sensor 56. Sensor 56 is affixed to a signal amplifier 58, externally disposed relative to chamber 50.

Housing 52 comprises an exit orifice 58 leading to a pathway 60 which is gated by a second or outlet valve 70. Pathway 60 opens into a containment housing 80 which comprises a receiving reservoir container 90 for sterilized liquid (e.g. water). A container filled sensor 92 is superiorly affixed to housing 80 for communicating with liquid displaced through pathway 60.

Figure 2:
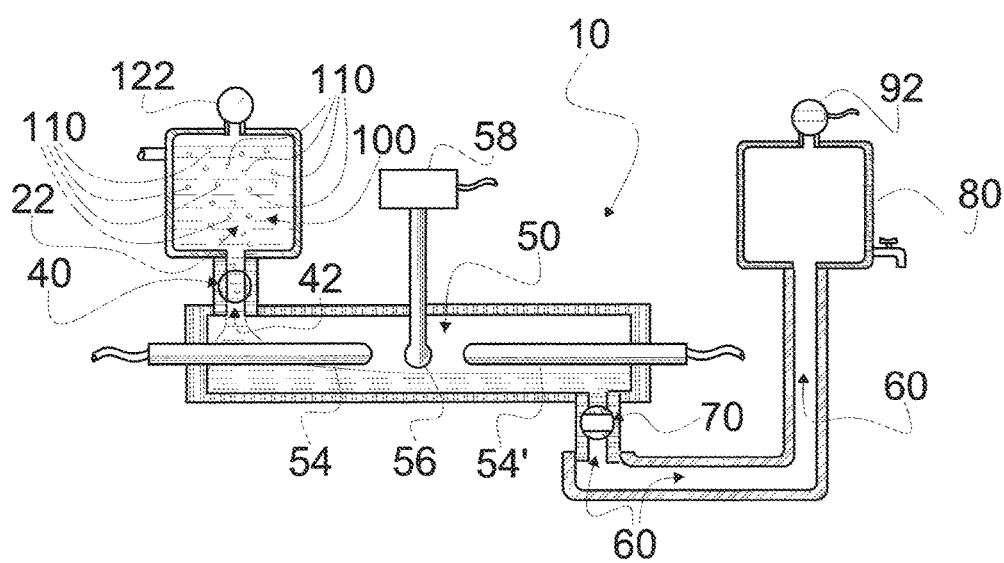
FIG. 2 is a schematic diagram of the system seen in FIG. 1 is seen to be have a first valve open for displacing water into a heating chamber of an otherwise empty system.

As seen in FIG. 1, vessel 22 is initially filled with liquid while heating chamber 50 and container 90 are empty as would be the case before system 10 begins operation. Reference is now made to FIG. 2 wherein valve 40 is disposed in an open state, permitting fluid flow through pathway 42. Note that valve 70 remains closed. Therefore, liquid 100, displaced into chamber 50, displaces gas, seen generally as bubbles 110 flowing from chamber 50 into vessel 22. In this manner, chamber 50 is "auto-primed".

Preferably, valve 40, which may be an electrically driven ball valve which is actuated via an opened/closed/opened/closed cyclic operating sequence to provide for flow control into chamber 50 while ending with valve 40 in a closed state. Valve rotation rate and number of valve cycles are determined by liquid flow rate into chamber 50.

It should be understood that, during all normal operating cycles, heating elements 54 and 54' are preferably powered for heating liquid resident in chamber 50.

Figure 2A:
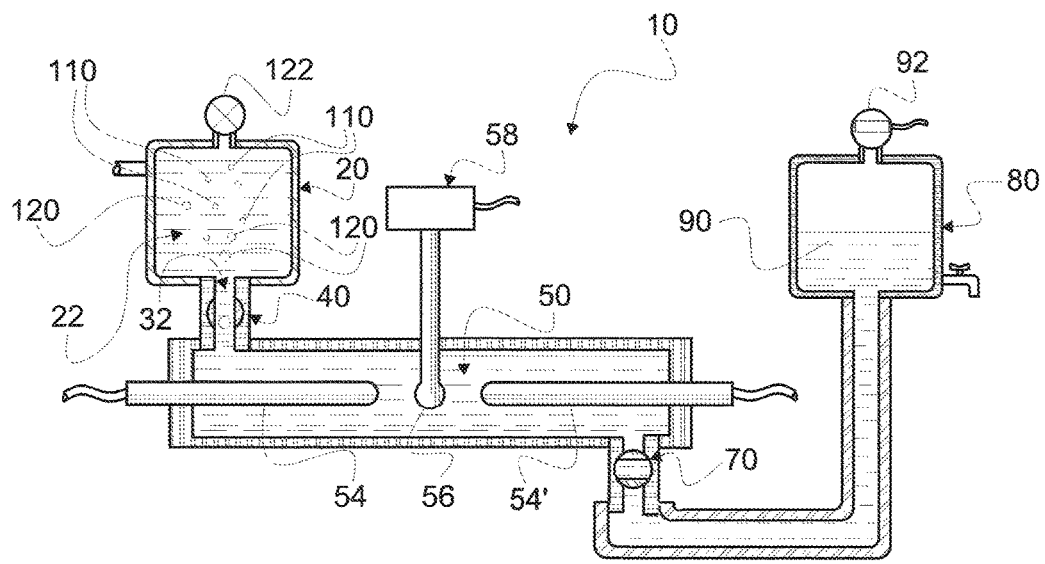
FIG. 2A is a schematic diagram of the system seen in FIG. 2, wherein liquid is disposed in all chambers.

As seen in FIG. 2A, which is more a representative state of system 10 under continuous operation following previous system cycles, container 90 is partially filled by prior operating cycles. Also it should be noted that when liquid is released to a lower pressure container, in a prior chamber dispensing cycle, a portion liquid heated to CT changes to a gas (steam) state. Note that this particular operation is distinctively different from continuous flow systems which must monitor and retain pressure at a predetermined level to assure a desired SAL producing temperature is maintained. Thus, both steam and any remaining gas still remaining in chamber 50 can flow into vessel 22 as indicated by steam bubbles 120 and air bubbles 110 in vessel 22. Of course, as liquid in a steam state is cooled in vessel 22 the gas/steam state changes to liquid and only air remains as gas bubbles. As gas is captured in vessel 22, a superiorly disposed manual valve 122 is provided for purging excess gas from vessel 22.

Figure 3:
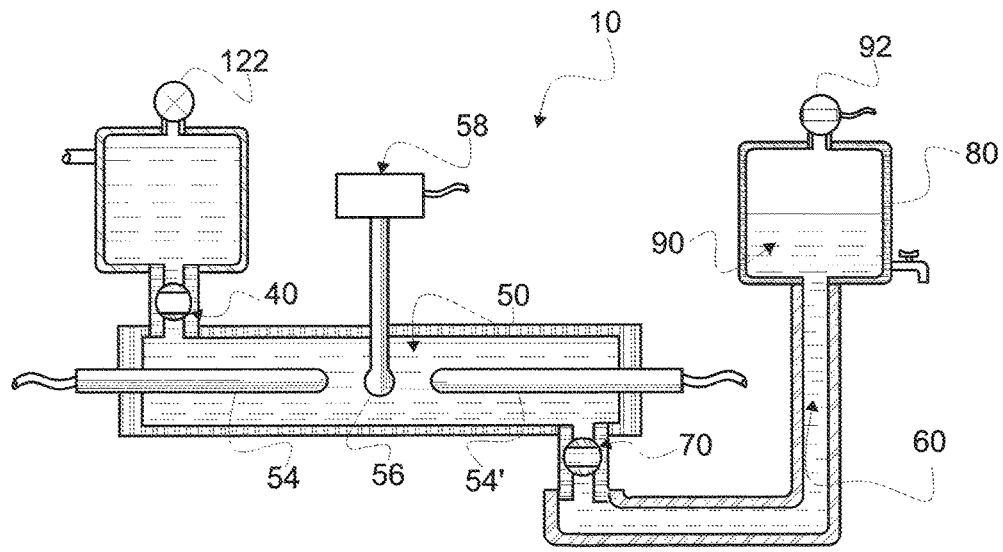
FIG. 3 is a schematic diagram of the system seen in FIG. 2A wherein liquid is disposed in a filled and closed heating chamber.
Figure 4:
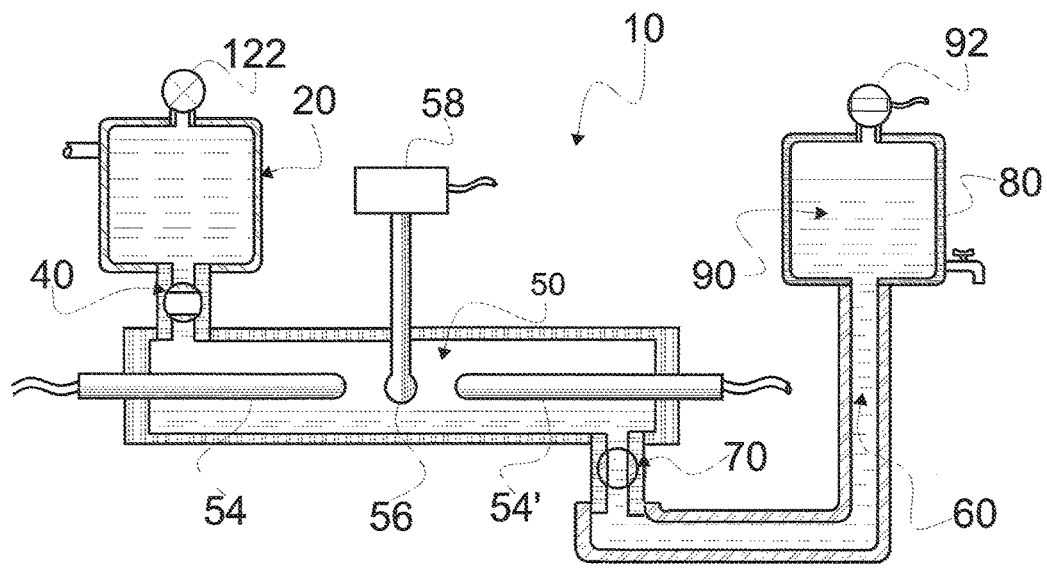
FIG. 4 is a schematic diagram of the system seen in FIG. 3 wherein a second valve is open with liquid dispensed from the heating chamber.

Once chamber 50 is filled, valves 40 and 70 are closed, seen in FIG. 3, and temperature is driven toward the CT. When a signal from temperature sensor indicates the CT of liquid in chamber 50 has been reached, valve 70 is opened as seen in FIG. 4. Back pressure from liquid in container 90 is significantly less than pressure in chamber 50 at the CT, resulting in a tumultuous change of state to steam of a portion of liquid heated to the CT. Creation of such steam evacuates liquid from chamber 50 into pathway 60 and into container 90. In similar manner to valve 40 actuating sequence, valve 70 is preferably driven through an opened/closed/opened/closed cyclic operating sequence at a rate and for a number of times which permit desired evacuation of sterilized liquid from chamber 50 into container 90.

Figure 5:
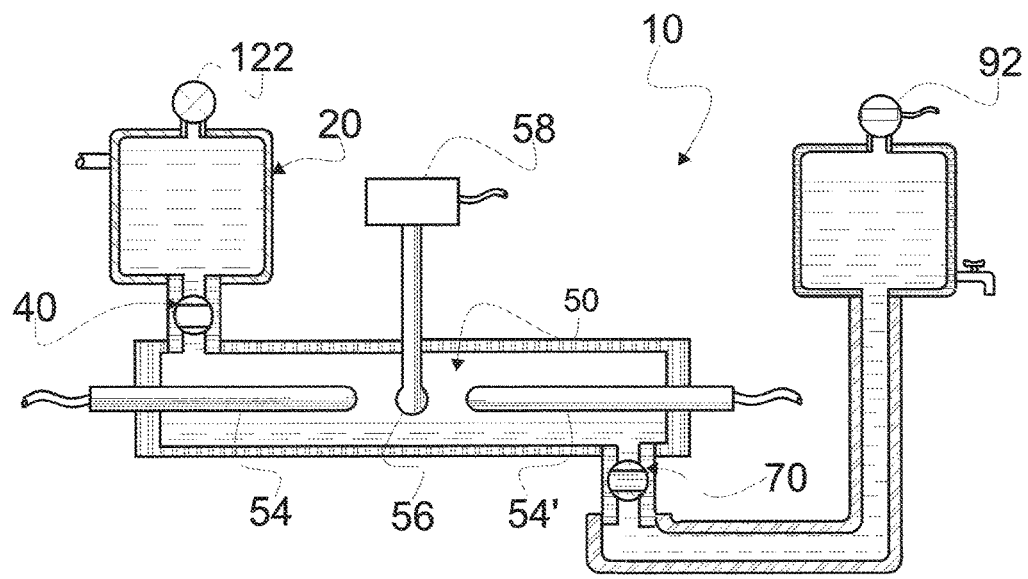
FIG. 5 is a schematic diagram of the system seen in FIG. 4 with both valves closed.

At the end of this dispensing sequence, valve 70 is closed. To assure no unsterilized liquid can find passageway into container 90, a delay in system operation, with in the valve 40 and 70 states, seen in FIG. 5, provides for additional operational safety.

Figure 6:
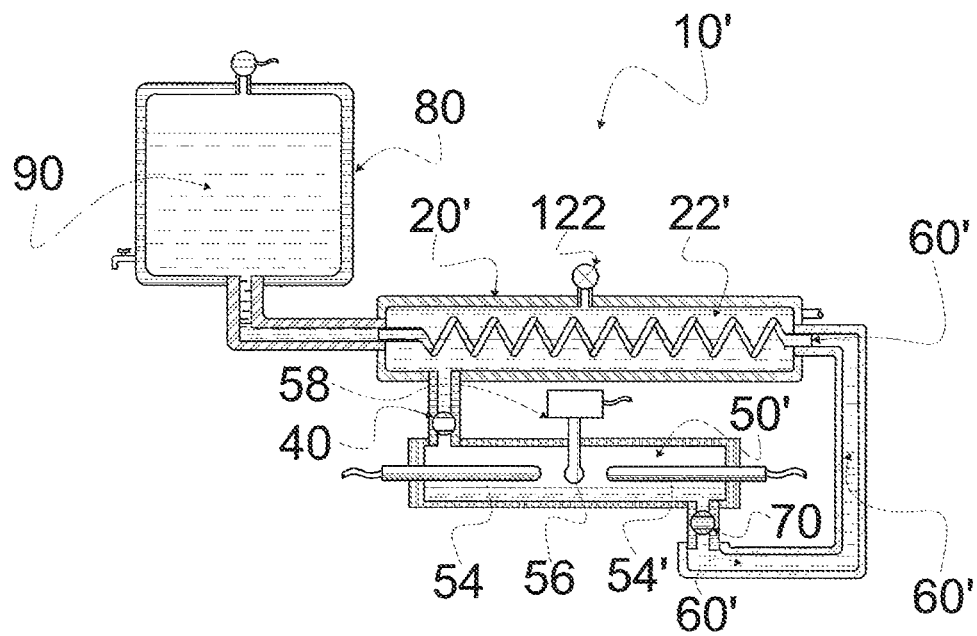
FIG. 6 is a schematic diagram of a system similar to the system seen in FIG. 5 is a heater closed state also similar to the state seen in FIG. 5, but with a discharge path through a heat exchanger disposed within a source housing.

As is common practice in sterilizing systems, a pathway 60' is seen in a system 10' to be enclosed within a vessel 22' of a housing 20', as seen in FIG. 6. Pathway 60' provides for transferring heat dispensed in effluent from a heating chamber 50 (sterilized liquid) to "to be sterilized" liquid resident in vessel 22'.

Figure 6A:
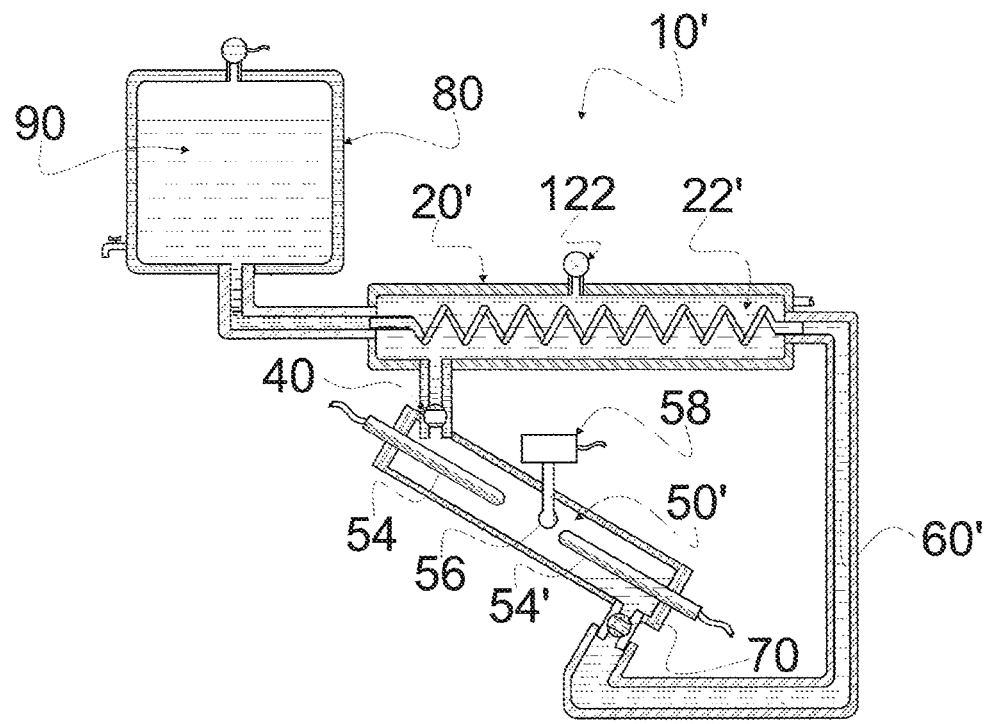
FIG. 6A is a schematic diagram of a system similar to the system seen in FIG. 6 wherein the heating chamber is tilted to facilitate priming and liquid dispensing therefrom.

As mentioned supra, retrograde flow of gas into vessel 22 acts to prime chamber 50 and pressure of steam promotes dispensing of liquid from chamber 50. Both priming and dispensing can be made more efficient as exemplified in system 10' by tilting the heating chamber, such as chamber 50' seen in FIG. 6A.

Figure 9:
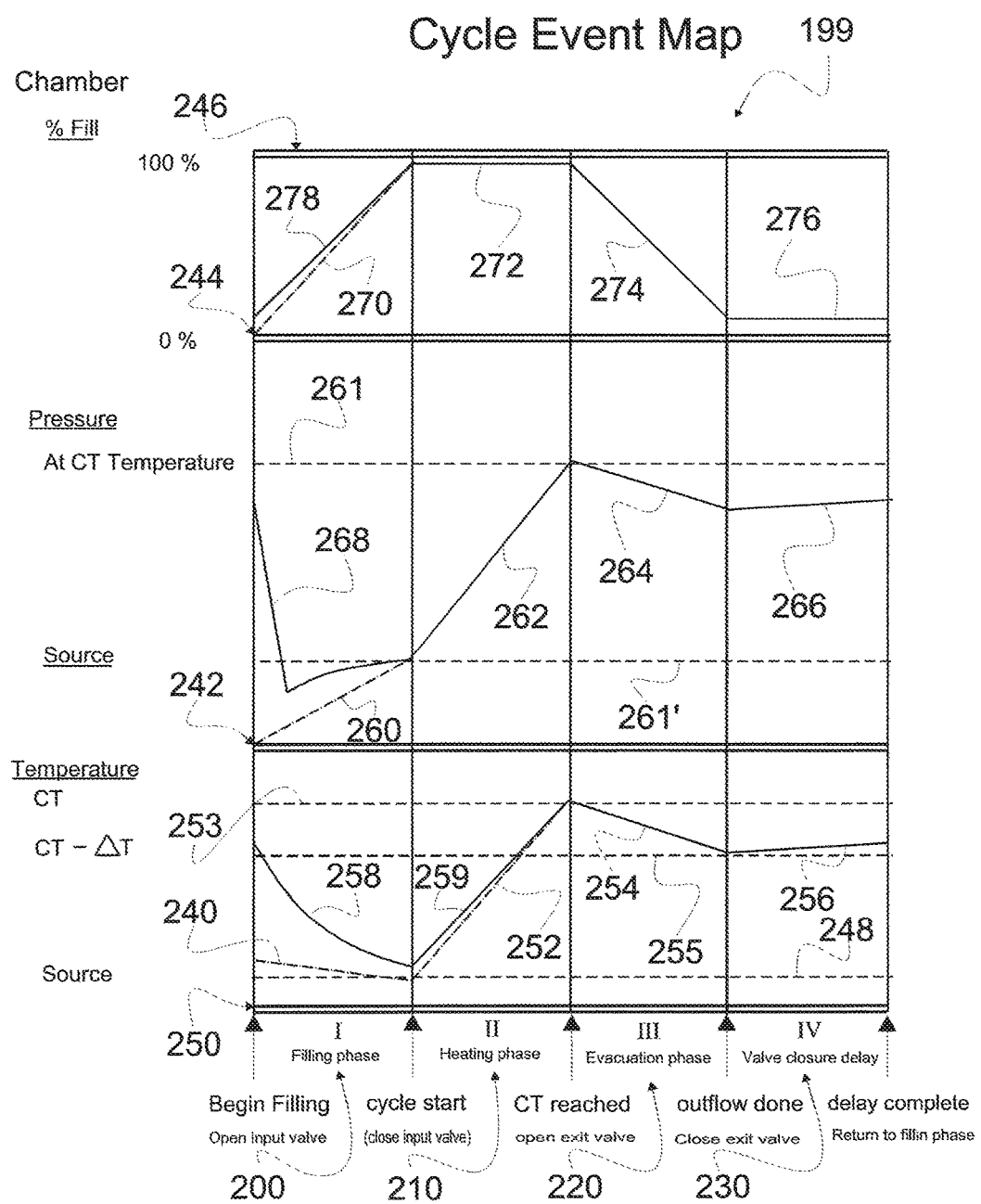
FIG. 9 is a chart providing a map of events plotting exemplary cyclic operation of an invention made according to the present invention showing temperature, pressure and chamber filling parameter fluctuations in each of four system cycles.

A charted summary 199 of system 10 operation is provided in the form of a Cycle Event Map in FIG. 9. Performance of three parameters, temperature of liquid in chamber 50, pressure in chamber 50 and percentage of filling of chamber 50 are graphed in FIG. 9. Each of four cyclic periods of system 10 operation is disclosed in FIG. 9. While the periods indicate a passage of time, time of the periods vary based upon beginning and processing conditions within each period making the period timing disproportionate.

It is cautioned that graphs provided are furnished for descriptive purposes and are meant to be descriptive and exemplary. Actual parametric measurements likely vary from values graphed.

Phase I (see Column 200) discloses parameter variations during filling of chamber 50 (while first valve 40 is in an open state (see FIGS. 2 and 2A). Phase II (see Column 210) discloses parameter variations during liquid heating to the CT after closing valve 40 (see FIG. 3). Phase III (see Column 220) discloses parameter variations during chamber 50 evacuation (displacement of liquid into container 90) (see FIG. 4). Phase IV (see Column 230) discloses parameter variations during a safety pause phase providing a delay which assures valves 40 and 70 are closed (see FIG. 5).

In system 10 operation:

Temperature variation is graphed between double lines 240 and 242.

Pressure variation is graphed between double lines 242 and 244.

Chamber 50 liquid content as a percentage of chamber 50 volume is graphed between double lines 244 and 246.

A source temperature of liquid in vessel 22 is depicted by dashed line 248. In the initial (chamber 50 empty) phase, temperature (see line 250) varies from chamber ambient to near source temperature during phase I. During phase II, liquid heating increases temperature (see line 252) to the CT (line 253). During phase III liquid evacuation of chamber 50 and resulting state change of a portion of liquid in chamber 50 to steam results in a drop in temperature (see line 254) to a gating value 255 (see dashed line 255 which indicates a valve 70 deactivating temperature). In phase IV temperature increases due to closed system heating (see line 256). In continuing cyclic operation, temperature at the beginning of phase I is the same as at the end phase IV and decreases to a lower temperature caused by source liquid 22 influx as depicted by line 258. As stated supra, temperature rises during phase II to the CT as depicted by line 259.

For pressure, line 242 indicates ambient (air) pressure level (unheated) and line 261 is pressure within chamber 50 at the CT. Line 261' depicts source or vessel 22 pressure. Pressure parameter variations which result from temperature changes under enclosed and open conditions are initially as indicated by lines 260, 262, 264 and 266 where graphic variations are shown for phases I, II, III and IV, respectively. In continuing cyclic operation, pressure at the end of phase IV is beginning pressure of phase I, as depicted by line 268. Note that cooling and state change of steam to water (liquid) precipitously drops pressure in chamber 50 below source pressure (line 261') which is then raised to source pressure as chamber 50 fills.

For chamber 50 liquid filling, line 244 depicts empty (0% filled) and line 246 depicts full 100% filled). As initially, chamber 50 is empty, initial state line 270 is depicted in contact with line 244 at the beginning of phase I. Chamber 50 is substantially filled as indicated by line 272 during phase II. Chamber 50 is emptied as seen by line 274 by opening valve 70 (see FIG. 4) and subsequent displacement due to steam generation. The filled state of chamber 50 during phase IV is substantially constant and reflected as chamber partially filled state at the beginning of Phase i as depicted by line 278.

As one who is skilled in mechanics of system controllers understands, there is a wide diversity in designs and component which can be used to control operation of system 10. The following disclosure is but one method for controlling and sequencing phases of system 10 operation.

Figure 7:
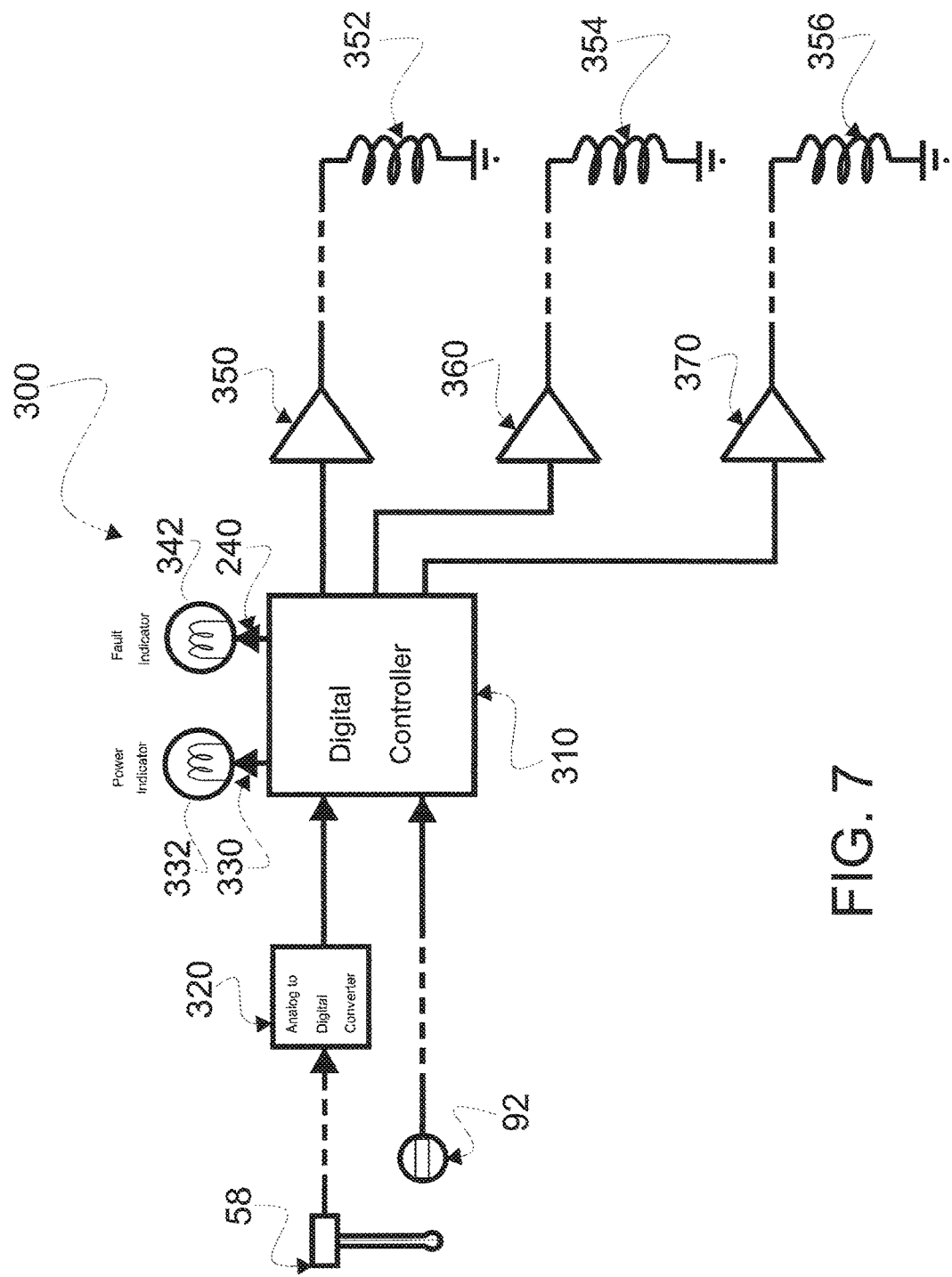
FIG. 7 is a block diagram of a controller for the systems seen in FIGS. 1-6A.

As seen in FIG. 7, an exemplary control system 300 for system 10 comprises a digital controller 310, an analog to digital converter 320 for receiving and converting signals from temperature signal amplifier 58 (see FIG. 1), an on/off driver 330 for a power indicator light 332, an on/off driver 340 for a fault indicator light 342, an amplifier 350 for empowering heaters 54 and 54' (see FIG. 1) and amplifiers 360 and 370 for powering valve-state controlling elements 354 and 356 of valves 40 and 70, respectively (see FIGS. 1-5). Also, controller 310 comprises a state sensor for container 90 filled sensor 92 (see FIG. 3).

Figure 8:
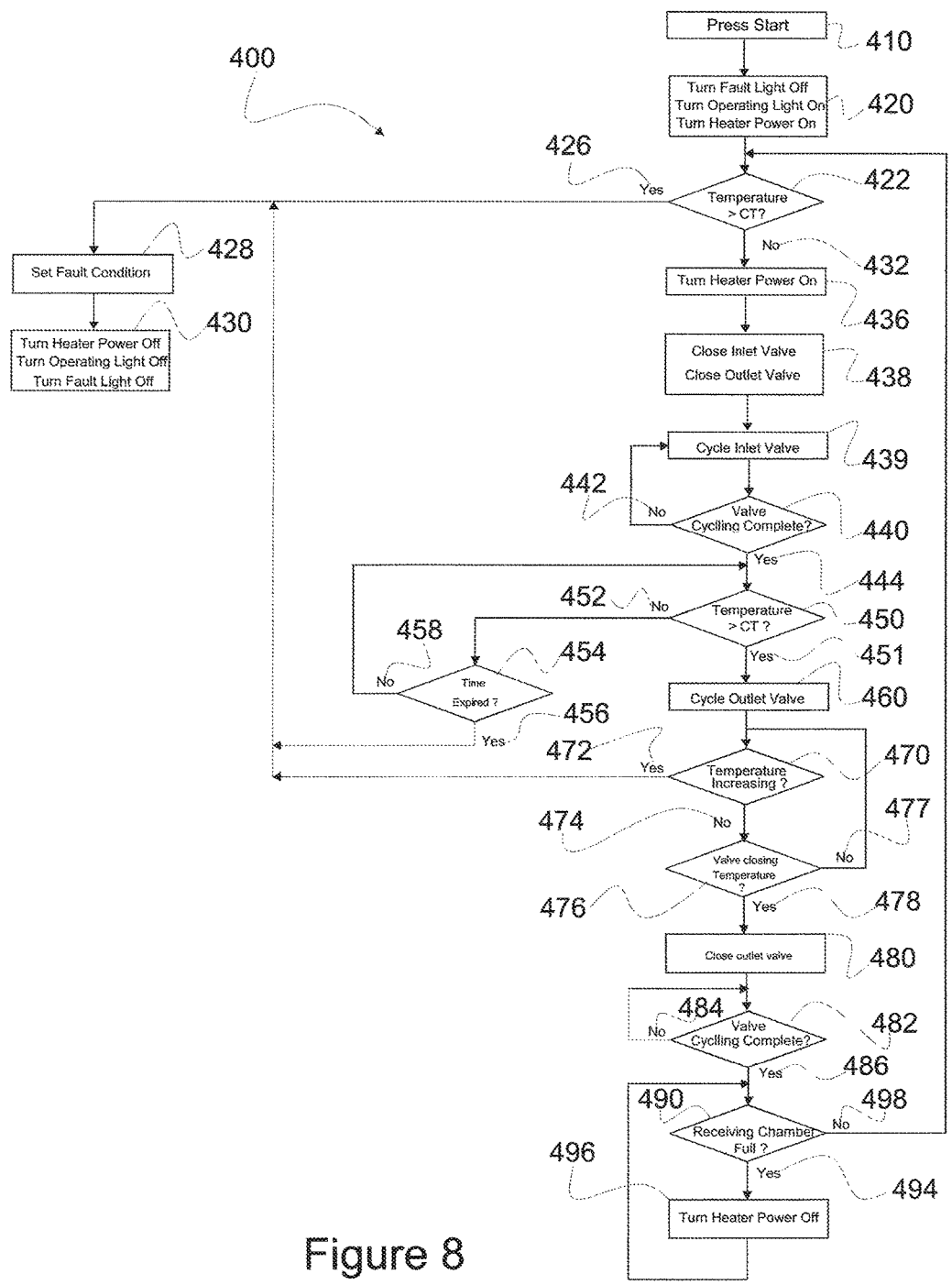
FIG. 8 programming flow diagram providing an example of logic steps for controlling operation of a system made according to the present invention.

In this example, controller 310 is a microprocessor with conventional input and output capability. A program flow diagram 400 seen in FIG. 8 provides exemplary logical steps for system 10 operation.

Operation is begun (per function block 410) by manually pressing a start button (not shown). Computer function block 420 provides a reset signal to fault light driver 340, turns on power-on light 332 and closes all valves.

Phase I (See FIG. 9)

Next step is decision block 422 which measures chamber 50 temperature and determines whether or not the temperature is greater than the CT (a failure condition). If yes 426, next program step is to function block 428 which, along with function block 430 stores a fault code and removes power from amplifier 350 (heater power), turns power indicator light 332 off and fault indicator light 342 on. In this state, system 10 is dormant awaiting manual intervention.

If decision block 422 result is no 432, program flow continues to function block 436 wherein amplifier 350 is actuated to initiate chamber 50 heating (see FIG. 7) and function block 438 closes valves 40 and 70.

The next step is function block 439 which cycles valve 40 through a 360 degree rotation from closed to open to closed to open to closed state. The following decision block 440 determines whether or not the previous valve 40 cycle was adequate to fill chamber 50 to a desire level based upon effective vessel 22 pressure, valve 40 flow resistance and chamber 50 volume (all of which are known design parameters). If a not filled decision is made, no decision 442 returns program flow to function block 439.

Phase II (see FIG. 9)

Otherwise, yes decision 444 continues to decision block 450 where temperature is measured with a decision determined by whether or not temperature is above the CT. If no decision 452 finds temperature below CT, next step is to decision block 454. Block 454 tests for excessive time required to bring temperature to the CT. If too much time has expired, decision 456 diverts to next step to function block 428 (to record a failure and turn system 10 off). Otherwise no decision 458 causes program flow to decision block 450. If success criteria of decision block 450 is satisfied by decision 451, decision yes determines next step is to function block 460.

Phase III (see FIG. 9)

Function of block 460 is to cycle valve 70 (see FIGS. 4 & 5) through a 360 degree rotation which opens and finally closes valve 70, thereby causing an outflow of sterilized water to container 90 due to motivating forces of reduced pressure and creation of steam in chamber 50 (see FIG. 4).

Next step is to decision block 470 which is a test for non-performance of dispensing fluid from chamber 50. Decision 472 is indicative of increasing temperature in chamber 50 with valve 70 having been opened, resulting in a failure and next step being block 428.

If temperature in chamber 50 is decreasing, no decision 474 moves to next step decision block 476 whereat yes decision 478 indicates achieving specific reduced temperature level which provides for a valve 70 closure condition. Note: If valve 70 is cycled in the same manner as valve 40

(i.e. closed/open/closed/open/closed), valve 70 cycling is stopped by yes decision 478, drive power is removed from valve 70 (see Function 480).

Phase IV (see FIG. 9)

A predetermined time delay is imposed (decision block 482) to assure closure of valve 70. If cycling period is incomplete, no decision 484 recycles. Otherwise, yes decision 486 determines valve cycling complete.

In phase IV, before cycling to Phase I, a test is made to determine whether or not container 90 is filled. Decision block 490 tests status of filled sensor 92 (See FIG. 5). If yes decision 494 indicates container 90 filled, program flow proceeds to function block 496 which turns power of heaters 54 and 54' off (see FIGS. 5 and 7). From function block 496 program flow cycles to decision block 490. No decision 498 redirects program flow to decision block 422 recycling to Phase I.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for providing and operating a self priming, self evacuating, cyclicly operating, sterilizing apparatus which sterilizes a mass of liquid disposed within a fluid tight, valved chamber by raising the liquid mass to a predetermined critical temperature (CT), which is above the temperature level at which the liquid mass undergoes a state change from liquid to gas, to achieve a predetermined sterility assurance level (SAL), said method comprising the steps of:

providing:

the chamber comprising a liquid constraining volume wherein the mass of liquid is sterilized by being raised to the CT at which the predetermined SAL is achieved;

a pressurized source of the liquid mass to be sterilized, said source comprising a pressure by which liquid is communicated from said source into said chamber;

a liquid communicating pathway between said source and said chamber which comprises a first flow-interrupting normally closed valve;

a reservoir for receiving the so-sterilized liquid mass, said reservoir comprising a hydraulic pressure which is conducive to outlet flow from the chamber to the reservoir;

a fluid communicating pathway between said chamber and said reservoir which comprises a second flow-interrupting normally closed valve;

a heating component by which the liquid mass in said chamber is raised to the critical-sterilizing temperature (CT) consistent with achieving the predetermined SAL;

a temperature meter for measuring temperature within said chamber and for providing a measurable output thereof;

a power source for operating a control system, said power source comprising a power on/power off controller; and a control system operable to sequencing of valve operation and, thereby, fluid displacement, via separate and distinct steps, as follows:

(a) step one: turning power on, opening said first valve thereby permitting a liquid mass to be displaced from said source into said chamber;

(b) step two: after a delay sufficient to permit the mass of liquid to fill said liquid constraining chamber, closing said first valve thereby heating said liquid mass toward the CT;

(c) step three: when said control system detects temperature of said meter has reached the CT, said control system opening said second valve thereby ending said liquid mass being limited to the liquid constraining volume of said chamber, as when said valves are closed, which results in a state change from liquid, therein, to a volumetrically expanding fluid mixture of liquid and gas, which provides a motive force which overcomes back pressure in said reservoir and, thereby, provides a motive force which displaces liquid and gas from the chamber into the reservoir, such state change and displacement resulting in a drop in measured temperature to a second control level temperature ending step 3 and proceeding immediately to step four; and (d) step four: said control system then delaying further operation a predetermined period to thereby permit said second valve to fully close and, thereafter, recycling operation to (a) step one.

2. A method for providing and operating a self-priming, self-evacuating, cyclicly operating, sterilizing apparatus according to claim 1 wherein said liquid mass is water.

3. A method for providing and operating a self-priming, self-evacuating, cyclicly operating, sterilizing apparatus according to claim 1 wherein said power source is disposed within said chamber.

4. A method for providing and operating a self-priming, self-evacuating, cyclicly operating, sterilizing apparatus according to claim 1 wherein said control system is operable for determining apparatus failure modes and for removing power from said heating components for ceasing operation.

* * * * *